United States Patent
Long et al.

(10) Patent No.: US 10,769,808 B2
(45) Date of Patent: Sep. 8, 2020

(54) APPARATUS AND METHODS OF AUTOMATED TRACKING AND COUNTING OF OBJECTS ON A RESOURCE-CONSTRAINED DEVICE

(71) Applicant: Microsoft Technology Licensing, LLC, Redmond, WA (US)

(72) Inventors: Donna Katherine Long, Redmond, WA (US); Arthur Charles Tomlin, Kirkland, WA (US); Kenneth Liam Kiemele, Redmond, WA (US); John Benjamin Hesketh, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 15/901,397

(22) Filed: Feb. 21, 2018

(65) Prior Publication Data

US 2019/0122381 A1    Apr. 25, 2019

Related U.S. Application Data

(60) Provisional application No. 62/575,141, filed on Oct. 20, 2017.

(51) Int. Cl.
  *G06T 7/70* (2017.01)
  *G06K 9/00* (2006.01)
(52) U.S. Cl.
  CPC .......... *G06T 7/70* (2017.01); *G06K 9/00771* (2013.01); *G06K 9/00993* (2013.01); *G06T 2207/20081* (2013.01); *G06T 2207/30242* (2013.01)

(58) Field of Classification Search
  CPC ............ G06T 7/70; G06T 2207/20081; G06T 2207/30242
  See application file for complete search history.

(56) References Cited

U.S. PATENT DOCUMENTS

| | | | | |
|---|---|---|---|---|
| 8,009,863 B1* | 8/2011 | Sharma | .............. | G06K 9/00335 348/159 |
| 8,213,679 B2* | 7/2012 | Yao | ..................... | G06K 9/00785 348/169 |
| 2007/0003141 A1* | 1/2007 | Rittscher | ............ | G06K 9/00778 382/181 |
| 2008/0184245 A1* | 7/2008 | St-Jean | .............. | G06K 9/00771 718/103 |
| 2010/0021009 A1* | 1/2010 | Yao | ..................... | G06K 9/00785 382/103 |
| 2011/0081043 A1* | 4/2011 | Sabol | ...................... | G06T 7/254 382/103 |

(Continued)

OTHER PUBLICATIONS

Chen "Glimpse: Continuous Real-Time Object Recognition on Mobile Devices" ACM (Year: 2015).*

(Continued)

*Primary Examiner* — Kim Y Vu
*Assistant Examiner* — Molly Delaney
(74) *Attorney, Agent, or Firm* — Arent Fox LLP

(57) ABSTRACT

The present disclosure provides apparatus and methods for automated tracking and counting of objects in a set of image frames using a resource-constrained device based on analysis of a selected subset of image frames, and based on selectively timing when resource-intensive operations are performed.

17 Claims, 2 Drawing Sheets

(56) References Cited

U.S. PATENT DOCUMENTS

| | | | | |
|---|---|---|---|---|
| 2013/0166711 | A1* | 6/2013 | Wang | H04N 7/181 |
| | | | | 709/223 |
| 2013/0182905 | A1* | 7/2013 | Myers | H04N 7/18 |
| | | | | 382/103 |
| 2018/0342070 | A1* | 11/2018 | Chen | G06K 9/00771 |

OTHER PUBLICATIONS

"International Search Report & Written Opinion Issued in PCT Application No. PCT/US18/055756", dated Jan. 28, 2019, 12 Pages.

Ranjan, et al., "Parallelizing a Face Detection and Tracking System for Multi-Core Processors", In Ninth Conference on Computer and Robot Vision, May 28, 2012, 8 Pages.

Shapiro, Roy D., "Scheduling Coupled Tasks", In Journal of Naval Research Logistics Quarterly, vol. 27, Issue 3, Sep. 1980, pp. 489-498.

\* cited by examiner

APPARATUS AND METHODS OF AUTOMATED TRACKING AND COUNTING OF OBJECTS ON A RESOURCE-CONSTRAINED DEVICE

RELATED APPLICATION

This application claims the benefit of U.S. Provisional Application Ser. No. 62/575,141, entitled "APPARATUS AND METHODS OF AUTOMATED TRACKING AND COUNTING OF OBJECTS ON A RESOURCE-CONSTRAINED DEVICE" and filed on Oct. 20, 2017, which is expressly incorporated by reference herein in its entirety.

BACKGROUND

The present disclosure relates to automated systems for tracking and counting objects.

Various automated systems exist for tracking and/or counting objects. For example, currently there are machine learning approaches for detecting people in an area, but they are extremely expensive computationally. Specifically, machine learning is powerful, but high quality classification with few false positives/negatives requires significant processing resources. There are also computer vision approaches, such as simple blob tracking, but they lack accuracy. There are more complex computer vision approaches, however, these approaches demand large amounts of computational resources.

Thus, there is a need in the art for improvements in tracking and counting objects.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The disclosure provides a computer device for automated object tracking and counting, including a memory comprising instructions, and a processor in communication with the memory and configured to execute the instructions. The processor is configured to: obtain a set of image frames captured over time; detect one or more objects in the set of image frames; track positioning of the detected one or more objects in each of the set of image frames; determine whether a current timing condition meets one or more classification timing rules; select a subset of image frames from the set of image frames based on a selection parameter of each of the subset of image frames meeting a selection criteria, in response to the current timing condition meeting the one or more classification timing rules; classify as a respective object type each of the detected one or more objects; count a number of the classified object types in the subset of image frames; and output the number of the classified object types as a current count of the classified object type.

In some examples, the selection parameter includes a distance of a position of each of the subset of image frames to a target position, and wherein the selection criteria comprises a number of image frames having a lowest distance.

In some examples, the selection parameter includes an amount that each of the subset of image frames covers a target image frame, and wherein the selection criteria comprises a number of image frames having a highest amount of coverage.

In some examples, the selection parameter includes a direction of movement of each of the subset of image frames, and wherein the selection criteria comprises a defined direction of movement.

In some examples, the one or more classification timing rules allow for adjustability in balancing classification quality and processing speed. For instance, the one or more classification timing rules include enabling the processor to perform one or more of the selecting, the classifying, or the counting in one or more of the following situations: only when the detecting or the tracking is not operating; when a number of subsets or a memory size of the number of the subsets of object image frames are pending processing; or when at least one of the subset of object image frames is pending processing and a time since a last one of the selecting, the classifying, or the counting was performed satisfies (e.g., meets or exceeds) a threshold.

In some examples, the processor is further configured to add the current count corresponding to the number of the classified object types to a value of a previous total count of the classified object types to define a current total count, and to output the current total count.

In some examples, the processor is configured to obtain another set of image frames captured over time in response to the current timing condition not meeting the one or more classification timing rules, and perform the detecting and tracking for the another set of image frames In another implementation, this disclosure provides an automated method of counting objects including receiving a plurality of image frames from a camera and detecting at least a first unidentified object in each of a first set of the plurality of image frames. Further, the method includes tracking at least the first unidentified object through the first set of the plurality of image frames, and determining a selection parameter associated with each of the first set of the plurality of image frames. Also, the method may include selecting a first subset of image frames from the first set of the plurality of images based on each selection parameter of the first subset of image frames meeting a selection criteria. Additionally, the method may include determining that a classification timing meets a classification timing rule, and automatically classifying the at least one unidentified object as a first type of object based on analyzing the first subset of image frames in response to the classification timing trigger meeting the trigger condition. Further, the method may include identifying a number of the first type of object in the first subset of image frames to define a current count, updating a total count of the first type of object based on the number of the first type of object defined by the current count, and outputting the current count and/or the total count of the first type of object.

In yet another implementation, this disclosure provides a computer-readable medium storing instructions for automated object tracking and counting that are executable by a processor, comprising: instructions to cause the processor to obtain a set of image frames captured over time; instructions to cause the processor to detect one or more objects in the set of image frames; instructions to cause the processor to track positioning of the detected one or more objects in each of the set of image frames; instructions to cause the processor to determine whether a current timing condition meets one or more classification timing rules; instructions to cause the processor to select a subset of image frames from the set of image frames based on a selection parameter of each of the subset of image frames meeting a selection criteria, in response to the current timing condition meeting the one or more classification timing rules; instructions to cause the processor to classify as a respective object type each of the detected one or more objects; instructions to cause the processor to count a number of the classified object types in the subset of image frames; and instructions to cause the processor to output the number of the classified object types as a current count of the classified object type.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides apparatus and methods for automated tracking and counting of objects in a set of image frames using a resource-constrained device based on analysis of a selected subset of image frames, and based on selectively timing when resource-intensive operations are performed. For instance, the apparatus and methods may effectively implement processor and/or memory intensive solutions, such as machine vision systems for object tracking and machine learning techniques for object classification, by controlling the timing of resource utilization. Depending on the status of system resources at a given time, the apparatus and methods described herein may receive the set of image frames via a live feed (e.g., a video stream or a stream of still images) and process them in real time, or receive them (live or after-the-fact), store them, and then process them at a later time, or some combination of both. Thus, the present disclosure may allow a relatively resource-constrained device to efficiently balance resource utilization while enabling use of typically resource-intensive solutions.

Figure 1:
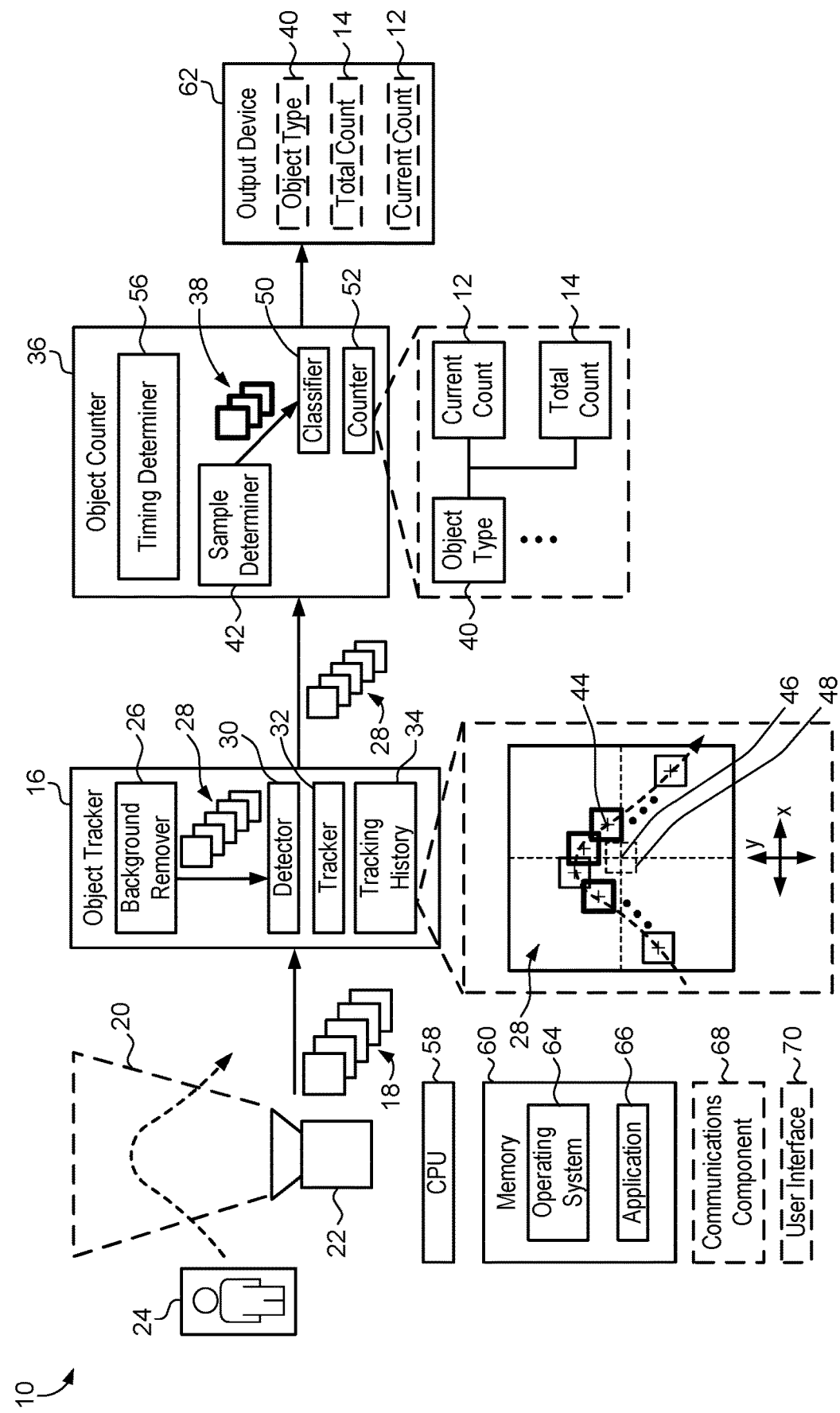
FIG. 1 is a schematic diagram of an example automated object tracking and counting system.

Referring to FIG. 1, an example automated object tracking and counting system 10 may be efficiently operated on one or more resource-constrained devices through use of selective image analysis and selectively-timed classification of detected objects in the selected images to generate a current count 12 of objects in an area, or a total count 14 of objects moving in or out of the area over time.

Object counting system 10 may include an object tracker component 16 for obtaining a set of image frames 18 that capture images from an area 20 over time. For example, one or more sensor devices 22 may capture and provide the set of image frames 18, which may include one or more objects 24 captured within an area 20 (e.g., a field of view of the respective sensor device 22), to object tracker component 16. Object tracker component 16 may receive and process the set of image frames 18 in real time (e.g., a video stream or a stream of a sequence of still images), or receive them (live or after-the-fact), store them, and then process them at a later time, or some combination of both, depending on the status of system resources, as described in more detail below. In some implementations, object 24 captured in the set of image frames 18 may be referred to as a blob (e.g., a binary large object), as the type of object may not yet be identified.

Suitable examples of sensor device 22 may include, but are not limited to, a still image camera, a video camera, an infrared sensor, a thermal sensor, a sonar device, or any other type of camera or sensor capable of capturing an image of an area in an image frame. Object 24 may be any type of physical thing, such as all or part of a person, an animal, a car, a truck, a product, or any other thing whose image may be captured by sensor device 22. In some implementations, object tracker component 16 may be further operable to perform a background removal process 26 to remove a background of area 20 from the set of images 18, thereby producing a set of object image frames 28. The set of object image frames 28 may generally have a size, e.g., number of pixels, smaller than the set of image frames 18 (which include the background) since the background of area 20 has been removed, thereby leaving only object 24, e.g., having a size corresponding to a portion of area 20, in each of the set of object image frames 28. At this point, it should be noted that while this discussion refers generally to object 24, such object 24 may be a grouping of two or more objects, e.g., two people walking closely together, a person and a dog walking together, etc. In any case, in other implementations, object tracker component 16 may receive the set of object image frames 28 from another device rather than performing background removal process 26.

Further, object tracker component 16 performs an object detection process 30 to detect object 24 (or a plurality of different objects) in the set of object image frames 28 so that each object can be identified and/or so that different objects can be distinguished from one another. Also, object tracker component 16 performs an object tracker process 32 to track and store a history of positions, e.g., a tracking history 34, of the detected object(s) 24 in area 20 over time based on the positions (e.g., x- and y-coordinates) of the detected object(s) 24 in area 20 (or the positions of the set of object image frames 28 in the original image frame, e.g., of sensor device 21). In general, at this point, it may not be known what kind of physical thing object 28 is, but just that some sort of object is present.

Additionally, object tracking and counting system 10 may include object counter component 36, in wired or wireless communication with object tracker component 16, for selecting a subset of object image frames 38 from the set of object image frames 28 and classifying an object type 40 of the one or more detected objects 24 based on analyzing the subset of object image frames 38. For example, object counter component 24 may perform a sample determiner process 42, which can determine one or more selection parameters associated with each of the set of object image frames 28, and which may select the subset of object image frames 28 from ones of the set of object image frames 28 having one or more selection parameters meeting a selection criteria. For example, in one implementation, the selection parameter may be a position 44 of each of the set of object image frames 28, and the selection criteria may be to pick up to a defined number of frames having position 44 closest in distance to an target position 46 of an target object frame 48. It should be understood that other selection parameters and other selection criteria may be defined, given the specific application of the described techniques, as will be discussed further below.

In any case, object counter component 36 may then execute an object classifier process 50 to analyze the subset of object image frames 38 and classify a respective object type 40 of the one or more detected objects 24 in the subset of object image frames 38. Object type 40 may be an identifier of a type of physical thing detected, where such identifier may identify, for example, all or part of a person, a woman, a man, a specific type of animal, a car, a truck, a tractor-trailer, a specific type of product, any other thing that can be identified in a captured image, or a binary type where the given object is identified as the type of object desired to be tracked or as not the desired object to be tracked (e.g., person versus not-person). For example, when operating using the binary object type, the object classifier process 50 may essentially cause any object not of the desired type to discarded. In the case of a discarded object type, some system resources may be saved by excluding the discarded object type from further processing, e.g., counting or other operations subsequent to the counting. In some cases, object type 40 may be selected from at least two option, e.g., a certain type of object or not that type of object. In other cases, object type 40 may be determined from among a plurality of different object types.

Object counter component 36 may further include an object counter process 52 configured to identify a number of classified object types 40 in the subset of object image frames 38. For example, the subset of object image frames 38 may contain a single object of a single object type, more than one object of a single object type, or a plurality of one or more different objects of different object types. As such, object counter process 52 may operate to generate a log 54 of each object type 40, current count 12 representing the number of that object type in the current subset of object image frames 38, and total count 14 representing a sum of current count 12 and a prior value of total count 14. In some implementations, current count 12 may be a number having a positive or negative value depending on a relative direction of travel of object 24 as determined based on the tracking history 34 of the set of object image frames 28, which object counter component 36 obtains from object tracker component 16. As such, the value of current count 12 may added to or subtracted from a prior value of total count 14 to obtain the current value of total count 14. Also, in some implementations, object counter process 52 may follow one or more counting rules, such as but not limited to rules that identify how to count objects depending on their path (e.g., add or subtract, count or don't count based on direction or point of entry or exit from the frame, etc.), which object types to count or not count, when (e.g., time of day ranges) to count, or any other rule that may modify a basic counting procedure for a given scenario.

Object counter component 36 may further include timing determiner process 56 configured to control operation of object counter component 36 or more specifically of sample determiner process 42 and/or object classifier process 50 and/or object counter process 52 so that such processes run at one or more specific times based on one or more classification timing rules. The classification timing rules may be designed in a manner that allows the processes to run on a resource constrained device, and/or in a manner that allows for adjustability in balancing classification quality (e.g., the number of false positives/negatives) and processing speed. Suitable examples of the one or more classification timing rules may include, but are not limited to, one or any combination of rules such as perform sample determiner process 42 and/or object classifier process 50 and/or object counter process 52; only when object tracker component 16 is not operating; when a number of subsets or a memory size of the number subset of object image frames 38 are pending processing (e.g., saved in a processing queue) at object counter component 36; when at least one subset of object image frames 38 is pending processing and a time since a last sample determiner process 42 and/or object classifier process 50 was performed satisfies (e.g., meets or exceeds) a threshold; or any other rule that takes into account balancing of device resources, such as usage of a central processing unit (CPU) 58 and/or memory 60 to enable object tracking and counting on a resource-constrained computer device implementing automated object tracking and counting system 10. As such, timing determiner process 56 determines if current timing conditions meet one or more classification timing rules.

Additionally, based on its operations, object counter component 36 outputs current count 12 and/or the total count 14, and optionally the corresponding identified object type 28, for one or more objects 24 detected in the set of image frames 18, classified by object counter component 36, and, optionally, that meet the counting rules.

Thus, notably, object counter component 36 provides efficient system resource utilization through the selective choosing of the subset of object image frames 38 on which further analysis is performed, and via performing the sample determination, classifying, and counting processes under the control of timing determiner process 56 using classification timing rules, one or any combination of which enable efficient operations in a resource-constrained (e.g., processing and memory constrained) system.

In some implementations, object tracking and counting system 10 may further include an output device 62 in wired or wireless communication with object counter component 36 and able to receive and generate a representation of current count 12 and/or total count 14 (and optionally the identifier of object type 40) for consumption by a user. For example, output device 62 may be a user interface or display for presenting an image or visual depiction representing current count 12 and/or total count 14 (e.g., a graphic of a number), and/or an audio speaker for generating a sound representing current count 12 and/or total count 14 (e.g., a spoken number or a set of tones representing a number), a printer for printing a numerical graphic representing current count 12 and/or total count 14, or a haptic device for generating a haptic representation of current count 12 and/or total count 14, or any other type of mechanism capable of conveying a representation of current count 12 and/or total count 14 to a user.

Object tracking and counting system 10 may be an integral system implemented on a single computer device, or a distributed system with two or more portions (e.g., two or more of sensor device 22, object tracker component 16, object counter component 36, and output device 62) implemented on a corresponding two or more computer devices in wired or wireless communication with one another. The object tracking and counting system 10 may be, for example, any one or any distributed combination of a mobile or fixed computer device including but not limited to an Internet of Things (IoT) device, a sensor device, a sensor device having an activation mechanism (e.g., a motion sensor) that initiates the recording of the set of image frames 18 based on detection and/or movement of object 24 within area 20, a camera, a desktop or laptop or tablet computer, a cellular telephone, a gaming device, a mixed reality or virtual reality device, a music device, a television, a navigation system, a personal digital assistant (PDA), a handheld device, any other computer device having wired and/or wireless connection capability with one or more other devices, or any other type of computerized device capable of obtaining images, tracking objects in the images, and outputting a.

CPU 58 may execute instructions stored in memory 60. For example, the CPU 58 may execute an operating system 64 and one or more applications 66. Operating system 64 may system software that manages computer hardware and software resources and provides common services for computer programs, such as applications 66 stored in memory 60 and executable by CPU 58. Suitable examples of the one or more applications 66 may include, but are not limited to, an object counting application that controls the configuration and operation of sensor device 22, object tracker component 16, object counter component 36, and output device 62. CPU 58 may include one or more processors for executing instructions. An example of CPU 58 can include, but is not limited to, any processor specially programmed as described herein, including a controller, microcontroller, application specific integrated circuit (ASIC), field programmable gate array (FPGA), system on chip (SoC), or other programmable logic or state machine. CPU 58 may include other processing components such as an arithmetic logic unit (ALU), registers, and a control unit. CPU 58 may include multiple cores and may be able to process different sets of instructions and/or data concurrently using the multiple cores to execute multiple threads.

Memory 60 may be configured for storing data and/or computer-executable instructions defining and/or associated with an operating system 64 and/or the one or more applications 66. Memory 60 may represent one or more hardware memory devices accessible to object tracking and counting system 10. An example of memory 60 can include, but is not limited to, one or more of a type of memory usable by a computer, such as random access memory (RAM), read only memory (ROM), tapes, magnetic discs, optical discs, volatile memory, non-volatile memory, and any combination thereof. Further, memory 60 may store local versions of applications 66 being executed by CPU 58.

In some implementations, object tracking and counting system 10 may include a communications component 68 that provides for establishing and maintaining communications with one or more parties utilizing hardware, software, and services as described herein, and/or between the components of the system, and/or with external devices, such as devices located across a wired and/or wireless communications network and/or devices serially or locally connected to object tracking and counting system 10. For example, communications component 68 may include one or more buses, wired or wireless interfaces, a transmitter and receiver, one or more antennas, etc.

Additionally, in some implementations, object tracking and counting system 10 may include a user interface component 70 operable to receive inputs from a user of the system and further operable to generate outputs for presentation to the user. User interface component 70 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 70 may include one or more output devices, including but not limited to a display, a speaker, a haptic feedback mechanism, a printer, any other mechanism capable of presenting an output to a user, or any combination thereof. In an implementation, user interface component 70 may transmit and/or receive data, commands, and/or messages corresponding to the operation of operating system 64 and/or applications 66.

In some implementations, sensor device 22 and object tracker component 16 may be implemented as a machine vision system including a blob tracking algorithm.

In some implementations, object counter component 36 may be implemented in a machine learning model for classifying the objects. Suitable machine learning models may include, but are not limited to, one or more decision trees, neural networks, deep learning, Bayesian networks, genetic algorithms, inductive logic programming, support vector machines, clustering, rules-based learning, supervised learning algorithms, unsupervised learning algorithms, reinforcement learning algorithms, or any other type of artificial intelligence techniques.

It should be understood that object tracking and counting system 10 may be implemented using specially configured hardware, or in software executed by CPU 58 thereby transforming CPU 58 into a specially-configured processor, or in a combination of hardware and software, e.g., firmware.

In an implementation, the apparatus and methods of automated tracking and counting disclosed include a blob tracking technique to track objects through a space. After the objects leave the space, a decision forest based machine learning approach is used to classify each object as a type. In some implementations, a decision forest may be a collection or combination of two or more tree predictors, where each tree may be a set of nodes and edges organized in a hierarchical manner. This mixture of computer vision and machine learning allows objects to be tracked on a low power and/or resource (processor, memory)-constrained device. These techniques could be applied to solve problems with hybrid computer vision machine learning solutions or to a specific solution for people counting on a constrained device.

One or more features of the disclosed apparatus and methods may include, but are not limited to:

using a hybrid machine learning and computer vision approach to detect and classify objects travelling through a frame on constrained devices;

using low cost computer vision techniques to track all objects moving through a frame;

occasionally using expensive machine learning approaches in order to classify the objects that travelled though the frame;

filtering out undesirable objects and accurately counting desired objects;

trading-off computation for accuracy as needed in order to maintain high frame rates or high accuracy depending on the goals, e.g., use accuracy goals to determine how often the expensive approach needs to be run. For example, if higher accuracy is important, send more frames through the machine learning models. On the other hand, if reaction speed is more important than accuracy, check fewer frames;

running expensive machine learning tasks on separate background threads when no tracking tasks need to be completed; and deferred classification of tracked blobs—where the data for some subset of the data set (based on classification confidence, system load, or purely random selection) is cached in local or cloud storage for classification at a later time or by a much slower but higher precision classifier (or even human review) to feed back into the system for improving the count rate and providing better analysis of the error in the current counting rate.

Figure 2:
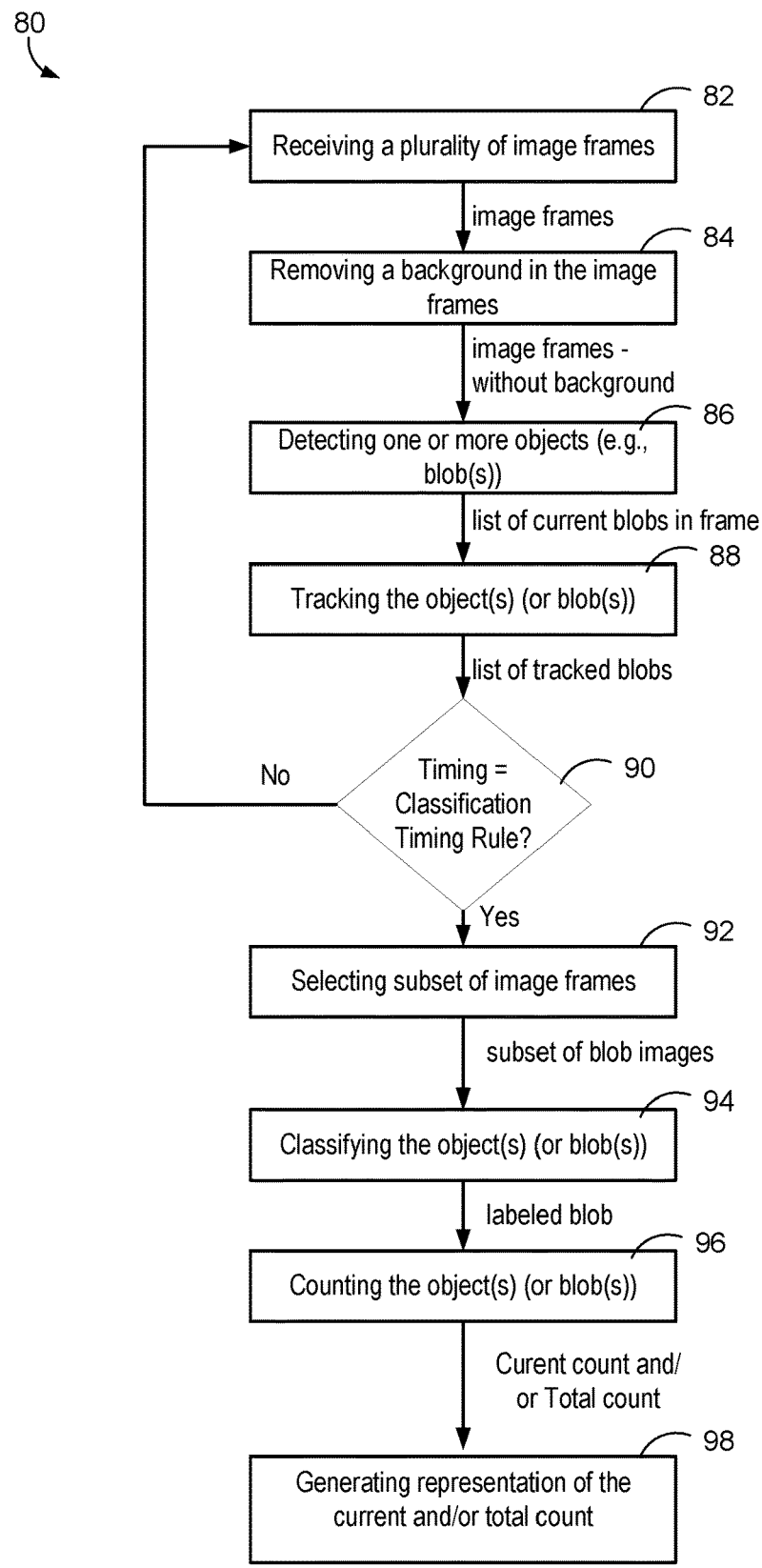
FIG. 2 is a flowchart of an example method of automated object tracking and counting that may be used by the system of FIG. 1.

Referring to FIG. 2, an example method 80 of operation of object tracking and counting system 10 includes a plurality of actions, some of which may or may not be performed by object tracking and counting system 10 depending on how the system is setup. Method 80 will be explained with some references back to FIG. 1. Further, method 80 may be used by object tracking and counting system 10 to track and count a plurality of different types of objects, such as but not limited to tracking people (or heads of people) entering or exiting an area, although it should be understood that there are numerous other implementations.

At block 82, method 80 may include receiving a plurality of image frames. For example, in an implementation, object tracker component 16 may be in communication with one or more sensor devices 22 via a wired or wireless communication interface and a wired or wireless communication link and may be able to receive a plurality of images, such as the set of image frames 18. The set of image frames 18 may be a sequence of images of at least one object 24 in area 20, e.g., field of view, as captured by sensor device 22 at a given frame rate. The frame rate of sensor device 22 may be configurable and/or dynamically adjustable, so that when sensor device 22 is setup to track fast moving objects 24, the frame rate may be set to a higher number as compared to when sensor device 22 is set to track relatively slower moving objects 24. Further, the one or more objects 24 may be in all of the set of image frames 18, e.g., at different positions in the image frame depending on a path of each object 24 through area 20. For example, sensor device 22 having a motion detector may be activated to capture the set of image frames 18 when any object 24 enters and/or moves within area 20. Additionally, each object 24 may also be referred to as a blob, as the type of object may not yet be determined.

At block 84, method 80 may include removing a background in the image frames. For example, in an implementation, object tracker component 16 may execute background removal process 26, which may be an algorithm that compares each of the set of image frames 18 and removes portions that do not change over time, e.g., the background, thereby leaving only portions of the image frame that include the one or more objects 24 or blobs. Removing the background results in the set of image frames being modified to be a set of image frames without background, also referred to herein as the set of object (or blob) image frames 28, as these image frames contain the information (e.g., pixels) that represent one or more objects 24 (or blobs). In some implementations, object tracking and counting system 10 may improve an efficiency of the process in general, and/or in background removal process 26, by configuring the one or more sensor devices 22 with a detector to trigger image capture based on presence or motion of objects such that all or substantially all of the set of image frames 18 include one or more objects 24. In an implementation, a size (e.g., x- and y-coordinates of the pixels; or an area of the remaining image) of the image frames without background varies depending in a size and shape of the object(s) or blob(s), and may be generally smaller than a size of the original set of image frames.

At block 86, method 80 may include detecting one or more objects (or blobs) in the set of image frames without background. For example, in an implementation, object tracker component 16 may execute object detection process 30 on the set of object (or blob) image frames 28 in order to identify one or more unique objects 24 (or blobs) across the set of object (or blob) image frames 28. For instance, operation of object detection process 30 may result in object tracker component 16 maintaining a list that uniquely identifies one or more current blobs in the set of object (or blob) image frames 28. The unique identification may be a name, number, size, etc., that can be used to confirm that a blob in one of the set of frames corresponds to the same object as another blob in another one of the set of frames.

At block 88, method 80 may include tracking the one or more objects (or blobs) through the set of image frames without background. For example, in an implementation, object tracker component 16 may execute object tracker process 32 to determine position 44 (e.g., in x- and y-coordinates) for each object image frame 28 relative to the original image frame, thereby representing a path of each object 24 through area 20. As such, in some implementations, object tracker process 32 can determine entry and exit points of each object 24 with respect to area 20, as well as direction of travel. Moreover, the tracked positions 44 may be in a same coordinate system as target position 46 of target object image frame 48, which may be utilized later by the system for selecting the most useful object image frames. In some implementations, the result of object tracker process 32 may be a list of tracked objects/blobs and their corresponding set of object image frames 28.

At decision block 90, method 80 may include determining whether current timing conditions meet one or more classification timing rules. For example, in an implementation, object tracker component 16 may execute timing determiner process 56 to control operation of object counter component 36, or more specifically of sample determiner process 42 and/or object classifier process 50 and/or object counter process 52, so that such processes run at one or more specific times based on one or more classification timing rules. As mentioned above, the classification timing rules may be designed in a manner that allows the processes to run on a resource constrained device, and/or in a manner that allows for adjustability in balancing classification quality and processing speed.

It should be noted that while decision block 90 is illustrated as occurring before block 92 (selecting a subset of image frames), object tracker component 16 may execute timing determiner process 56 prior to any or all of the blocks subsequent to block 88.

If the current timing conditions do not meet the one or more classification timing rules, then method 80 may return to block 82. For example, method 80 may receive or obtain another set of image frames captured over time in response to the current timing condition not meeting the one or more classification timing rules, and may perform blocks 84, 86, 88, and/or 90 for the other set of image frames.

Alternatively, if the current timing conditions do meet the one or more classification timing rules, then method 80 may proceed to block 92 and may include selecting a subset of image frames for further processing. For example, in an implementation, object tracker component 16 may execute sample determiner process 42 to select a subset of object image frames 38 from the received set of object image frames 28 associated with each detected object. For instance, sample determiner process 42 may determine one or more selection characteristics of each of the set of object image frames 28, and compare them to one or more selection criteria in order to reduce the number of image frames to be further processed.

As mentioned, the selection criteria may be one or more parameters and values that identify what may be considered a target object image frame 48, e.g., a frame that may be better suited than other frames to enable object tracker component 16 to classify an object type of the object and thereby count the object. For instance, the selection parameter may be position 44 of a given object image frame 28, and the selection criteria may be to choose up to a given number of object image frames 28 that are closest to target position 46 of target image frame 48. Other selection criteria and selection parameters may include, for example, an amount that a given object image frame 28 covers target object image frame 48. Additionally, for example, other alternative or additional selection criteria and selection parameters may include a direction of movement of a given object image frame 28, as certain positions and orientations of objects that can be correlated to movement may provide object tracker component 16 with a better chance of classifying the object. In an implementation, the operation of sample determiner process 42 may result in a subset of object (or blob) images being selected for further processing.

At block 94, method 80 may include classifying the object(s) (or blob(s)) identified across the subset of image frames. For example, in an implementation, object tracker component 16 may execute object classifier process 50 to analyze the subset of object image frames 38 and classify a respective object type 40 of the one or more detected objects 24 in the subset of object image frames 38, as discussed above. In an implementation, the operation of object classifier process 50 may result in labeling one or more objects (or blobs) that appear in all of the subset of object image frames 38, which enables identifying of a number and type of object (or blob) for counting purposes.

At block 96, method 80 may include counting the object(s) or blob(s) identified via the classification. For example, in an implementation, object tracker component 16 may execute object counter process 52 configured to identify a number of classified object types 40 in the subset of object image frames 38, as described in detail above. In an implementation, the operation of object counter process 52 may result in current count 12, and/or total count 14, and/or an identifier of object type 40, for one or more of the counted object types and associated with or given a timestamp, to be tracked and transmitted to output device 62.

At block 98, method 80 may include generating a representation of current count 12, and/or total count 14, and/or an identifier of object type 40. For example, in an implementation, output device 62 may generate or otherwise output such representation(s), as described above. In some cases, the representation may be a human-perceptible representation, such as displaying an object name (e.g., identifier of object type 40) and/or a number (current count 12 and/or total count 14) on a user interface.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as may be used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. An automated object tracking and counting system, comprising:
    a memory comprising instructions; and
    a processor in communication with the memory and configured to execute the instructions, wherein the processor is configured to:
        obtain a set of image frames captured over time;
        detect one or more objects in the set of image frames;
        track positioning of the detected one or more objects in each of the set of image frames;
        determine whether a current timing condition meets one or more classification timing rules;
        select a subset of image frames from the set of image frames based on a selection parameter of each of the subset of image frames meeting a selection criteria, in response to the current timing condition meeting the one or more classification timing rules, wherein the selection parameter includes a distance of a position of each of the subset of image frames to a target position of a target image frame, and wherein the selection criteria comprises a number of image frames having a lowest distance to the target position of the target image frame;
        classify as a respective object type each of the detected one or more objects;
        count a number of the classified object types in the subset of image frames; and
        output the number of the classified object types as a current count of the classified object type.

2. The system of claim 1, wherein the selection parameter includes an amount that each of the subset of image frames covers a target image frame, and wherein the selection criteria comprises a number of image frames having a highest amount of coverage.

3. The system of claim 1, wherein the selection parameter includes a direction of movement of each of the subset of image frames, and wherein the selection criteria comprises a defined direction of movement.

4. The system of claim 1, wherein the one or more classification timing rules allow for adjustability in balancing classification quality and processing speed.

5. The system of claim 1, wherein the one or more classification timing rules include enabling the processor to perform one or more of the selecting, the classifying, or the counting:
    only when the detecting or the tracking is not operating;
    when a number of the subset of image frames or a memory size of the number of the subset of image frames are pending processing; or
    when at least one of the subset of image frames is pending processing and a time since a last one of the selecting, the classifying, or the counting was performed satisfies a threshold.

6. The system of claim 1, wherein the processor is further configured to add the current count corresponding to the number of the classified object types to a value of a previous total count of the classified object types to define a current total count, and to output the current total count.

7. The system of claim 1, wherein the processor is further configured to:
    obtain another set of image frames captured over time in response to the current timing condition not meeting the one or more classification timing rules; and
    perform the detecting and tracking for the another set of image frames.

8. An automated method of counting objects, comprising:
    receiving a plurality of image frames from a camera;
    detecting at least a first unidentified object in each of a first set of the plurality of image frames;
    tracking at least the first unidentified object through the first set of the plurality of image frames;
    determining a selection parameter associated with each of the first set of the plurality of image frames;
    selecting a subset of image frames from the first set of the plurality of image frames based on each selection parameter of the subset of image frames meeting a selection criteria, wherein each selection parameter includes a distance of a position of each of the subset of image frames to a target position of a target image frame, and wherein the selection criteria comprises a number of image frames having a lowest distance to the target position of the target image frame;
    determining that a classification timing trigger meets a trigger condition;
    automatically classifying at least the first unidentified object as a first type of object based on analyzing the subset of image frames in response to the classification timing trigger meeting the trigger condition;
    identifying a number of the first type of object in the subset of image frames to define a current count;
    updating a total count of the first type of object based on the number of the first type of object defined by the current count; and
    outputting the current count and/or the total count of the first type of object.

9. The method of claim 8, wherein the selection parameter includes an amount that each of the subset of image frames covers a target image frame, and wherein the selection criteria comprises a number of image frames having a highest amount of coverage.

10. The method of claim 8, wherein the selection parameter includes a direction of movement of each of the subset of image frames, and wherein the selection criteria comprises a defined direction of movement.

11. The method of claim 8, wherein the trigger condition allows for adjustability in balancing classification quality and processing speed.

12. The method of claim 8, wherein the trigger condition includes enabling the method to perform one or more of the selecting, the classifying, or the counting:
   only when the detecting or the tracking is not operating;
   when a number of the subset of image frames or a memory size of the number of the subset of image frames are pending processing; or
   when at least one of the subset of image frames is pending processing and a time since a last one of the selecting, the classifying, or the counting was performed satisfies a threshold.

13. The method of claim 8, further comprising adding the current count corresponding to the number of the classified object types to a value of a previous total count of the classified object types to define a current total count, and to output the current total count.

14. The method of claim 8, further comprising:
   obtaining another set of image frames captured over time in response to the classification timing trigger not meeting the trigger condition; and
   performing the detecting and tracking for the another set of image frames.

15. A non-transitory computer-readable medium storing instructions for automated object tracking and counting that are executable by a processor, comprising:
   instructions to cause the processor to obtain a set of image frames captured over time;
   instructions to cause the processor to detect one or more objects in the set of image frames;
   instructions to cause the processor to track positioning of the detected one or more objects in each of the set of image frames;
   instructions to cause the processor to determine whether a current timing condition meets one or more classification timing rules;
   instructions to cause the processor to select a subset of image frames from the set of image frames based on a selection parameter of each of the subset of image frames meeting a selection criteria, in response to the current timing condition meeting the one or more classification timing rules, wherein the selection parameter includes a distance of a position of each of the subset of image frames to a target position of a target image frame, and wherein the selection criteria comprises a number of image frames having a lowest distance to the target position of the target image frame;
   instructions to cause the processor to classify as a respective object type each of the detected one or more objects;
   instructions to cause the processor to count a number of the classified object types in the subset of image frames; and
   instructions to cause the processor to output the number of the classified object types as a current count of the classified object type.

16. The non-transitory computer-readable medium of claim 15, wherein the one or more classification timing rules allow for adjustability in balancing classification quality and processing speed.

17. The non-transitory computer-readable medium of claim 15, wherein the one or more classification timing rules include enabling the processor to perform one or more of the selecting, the classifying, or the counting:
   only when the detecting or the tracking is not operating;
   when a number of the subsets of image frames or a memory size of the number of the subsets of image frames are pending processing; or
   when at least one of the subset of image frames is pending processing and a time since a last one of the selecting, the classifying, or the counting was performed satisfies a threshold.

* * * * *